July 30, 1940.  W. W. STUART  2,209,942
CONTROL SYSTEM
Filed Nov. 4, 1935
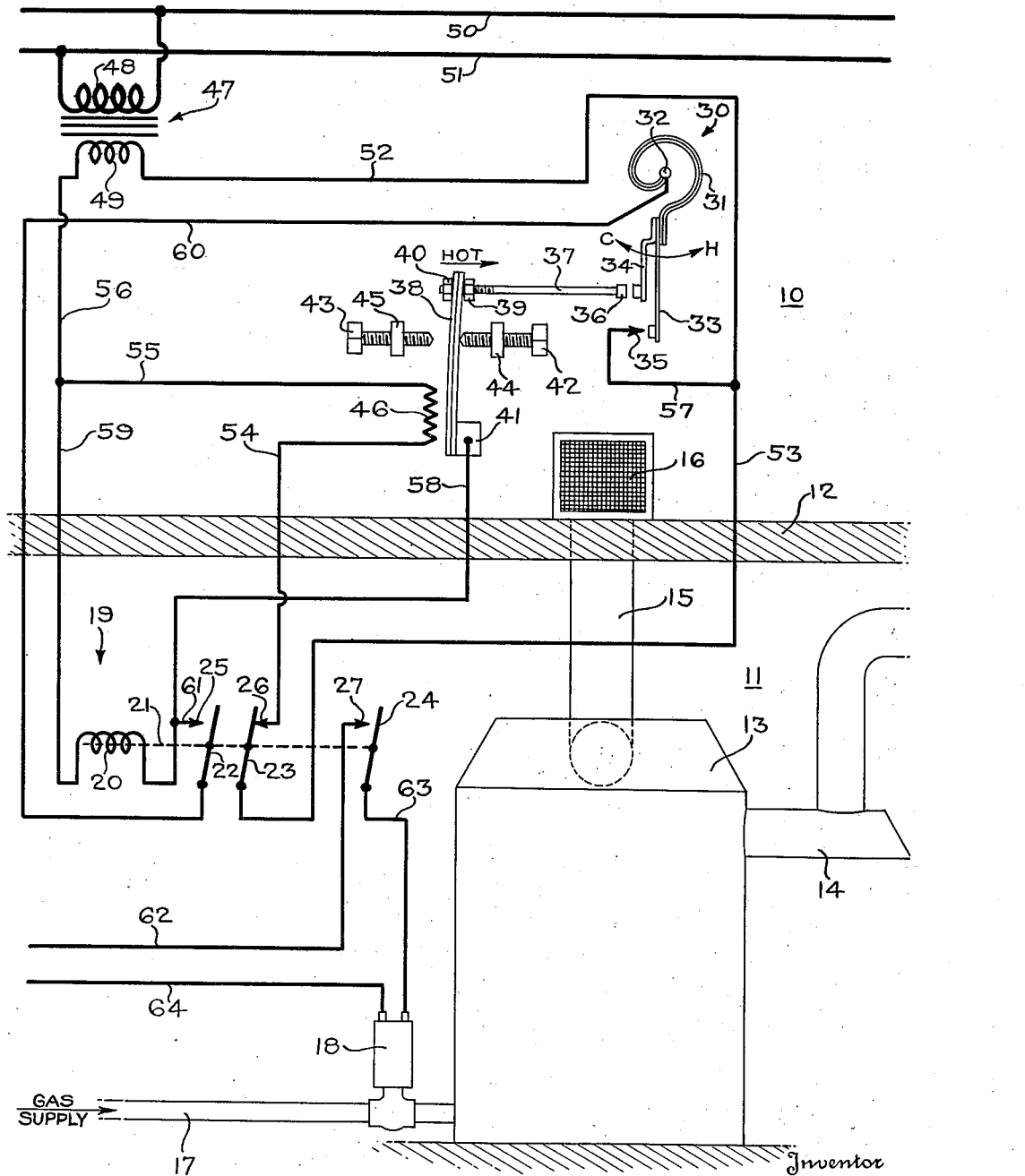
Inventor
William W. Stuart
By George H Fisher
Attorney Patented July 30, 1940

2,209,942

UNITED STATES PATENT OFFICE 2,209,942

CONTROL SYSTEM

William W. Stuart, Des Moines, Iowa, assignor to Minneapolis-Honeywell Regulator Company, Minneapolis, Minn., a corporation of Delaware Application November 4, 1935, Serial No. 48,127

17 Claims. (Cl. 236—68)

The present invention relates to a control system for controlling a condition such as a condition of the space, for example, a building, home, or the like.

Where it is desired to control the temperature of a home, for example, it is usual to provide a heating plant which is controlled by a room thermostat. Under conditions of mild weather, the heating plant should be operated for periods of short duration and in order to obtain such short operations the controlling thermostat should have a relatively narrow differential. If the differential is large, the heating plant operates for unduly long periods resulting in relatively wide fluctuations in the temperature of the building with a consequent loss of close temperature control. On the other hand, if a thermostat having a relatively narrow differential is utilized during more severe weather conditions, the heating plant will still operate for short intervals but in order to maintain the desired temperature in the building, the heating plant will then operate much too often to provide desirable results.

The present invention, therefore, contemplates varying the differential of a controlling device, such as a room thermostat, as a result of fluctuations or changes in the outside atmospheric conditions. In the particular embodiment to be described hereinafter, this adjustment of the differential of the controlling device is obtained as an indirect result of changes in outside conditions but it is to be understood that the adjustment could be made directly as the result of such changes.

An object of the present invention is the provision of a system for changing a condition, in which the controlling device in control of the condition changing apparatus has its differential automatically varied as a result of changes in the load upon the condition changing apparatus.

More specifically, an object of the present invention is the provision of a temperature control system in which the differential of the controlling thermostat is automatically varied in accordance with fluctuations in the outside atmospheric conditions.

Another object of the invention is the provision of a condition changing system in which the differential of the controlling device is varied in accordance with changes in load on the device by means of apparatus that responds or is controlled by the relative lengths of the time that the condition changing apparatus is in operation and is out of operation.

Other objects of the invention will be found in the description, the drawing and the appended claims.

For a better understanding of the invention, reference may be had to the following detailed description and the single accompanying drawing, which is a diagrammatic showing of one form of the invention as applied to a heating system for a building.

Referring to the single drawing, a building is indicated as comprising a space 10, which it is desired to control, and a basement or furnace room 11 located therebelow, there being a separating wall 12 therebetween. Located in the furnace room 11 is a heating plant herein shown as comprising a warm air furnace 13 having the usual stack pipe 14. This warm air furnace 13 supplies heated air to the space 10 through a header 15 and an associated register 16.

The warm air furnace 13 may be heated in any suitable manner usual in the art and is herein shown as heated by gas which is supplied thereto through a supply pipe 17. Located in the gas supply pipe 17 is an electrically operable valve 18 which is adapted to turn on and off the supply of gas to the warm air furnace 13.

The gas valve 18 is directly controlled by a relay generally indicated at 19 which includes a relay coil 20 and an associated armature 21. The armature 21 controls switch arms 22, 23 and 24, which respectively cooperate with contacts 25, 26 and 27. The arrangement is such that when relay coil 20 is deenergized, switch arm 23 is engaged with contact 26 and the switch arms 22 and 24 are disengaged from their cooperating contacts 25 and 27, respectively. Upon energization of the relay coil 20, switch arm 23 disengages contact 26 and switch arms 22 and 24 move into engagement with their respective contacts 25 and 27.

This relay 19 is controlled by a thermostat generally indicated at 30, which is located in and responds to the temperature of the space 10. The thermostat 30 includes a curved bimetallic actuating element 31 which has one of its ends secured to a post 32. Secured to the free end of bimetallic element 31 are two contact blades 33 and 34. The contact blade 33 cooperates with a normally stationary contact 35, whereas the contact blade 34 cooperates with an adjustable contact 36.

The contact 36 is adjusted as a result of changes in outdoor atmospheric conditions indirectly through apparatus which will now be described. This contact 36 is secured to or forms a head of a screw 37 which is connected to the free end of a bimetallic element 38, as by passing through the same and being clamped thereto by nuts 39 and 40. The other end of this bimetallic element 38 is secured to a suitable support 41. Stop screws 42 and 43, which are received by suitable threaded supports 44 and 45 limit the movement of bimetallic element 38 in both directions. Associated with the bimetallic element 38 is an electrical heating element 46 which is controlled in a manner that will be described under the heading "Operation."

Low voltage electrical power is supplied to the thermostat 30 and relay 19, as well as to the heating element 46, by a step-down transformer 47 having a high voltage primary 48 and a low voltage secondary 49. The primary 48 of the transformer 47 is connected to suitable line wires 50 and 51.

Operation

Upon temperature fall, the contact blades 33 and 34 move towards the associated contacts 35 and 36. The stop screw 42 is so adjusted that the contact blade 33 will always engage contact 35 prior to engagement of contact 36 by contact blade 34. The particular setting of this stop screw 42 determines the minimum differential of the thermostat 30. Similarly, the adjustment of stop screw 43 determines the maximum differential of the thermostat 30, which is obtained when the bimetallic element 38 moves into engagement therewith.

With the parts in the position shown, the space 10 is at or above the desired temperature and the outdoor weather conditions are relatively mild. The heating plant is not in operation. During this time, the electrical heating coil 46 is energized by a circuit as follows: Secondary 49, wire 52, wire 53, switch arm 23, contact 26, wire 54, electric heater 46, wire 55, and wire 56 to the other side of secondary 49. The heat thus transmitted to bimetallic element 38 maintains the same in engagement with stop screw 42 so that the differential setting of the thermostat 30 is at a minimum.

Since the heating plant is not in operation, the temperature of space 10 will soon fall sufficiently to bring contact blade 33 into engagement with contact 35. A further small decrease in the space temperature will then bring contact blade 34 into engagement with contact 36. When this occurs, relay coil 20 will be energized as follows: secondary 49, wire 52, wire 57, contact 35, contact blade 33, contact blade 34, contact 36, bimetallic element 38, wire 58, relay coil 20, wire 59 and wire 56 to the other side of secondary 49. Energization of relay coil 20 moves switch arm 23 from engagement with contact 26 whereupon the circuit to the electrical heater 46 is interrupted. Switch arms 22 and 24 are also moved into engagement with contacts 25 and 27, respectively. Engagement of switch arm 22 with contact 25 establishes a holding circuit for relay coil 20 which is independent of the contact blade 34 and contact 36. This holding circuit is as follows: Secondary 49, wire 52, wire 57, contact 35, contact blade 33, bimetallic element 31, wire 60, switch arm 22, contact 25, wire 61, relay coil 20, wire 59 and wire 56 to the other side of secondary 49. The relay coil 20 will, therefore, remain energized after the temperature in space 10 rises sufficiently to disengage contact blade 34 from contact 36 and until the space temperature has risen still further to disengage contact blade 33 from contact 35. Movement of switch arm 24 into engagement with contact 27 energizes the gas valve 18 by a circuit as follows: Line wire 62, contact 27, switch arm 24, wire 63, valve 18 and line wire 64.

The heating plant is now in operation and is delivering heated air to the space 10. Inasmuch as the outdoor conditions are mild, this delivery of heat to the space 10 will quickly cause the temperature thereof to rise. A slight rise in temperature moves contact blade 34 away from contact 36 but relay coil 20 remains energized by reason of the holding circuit described above. Shortly after this, the space temperature will have risen sufficiently higher to cause movement of contact blade 33 away from contact 35, whereupon the relay coil 20 is deenergized. Deenergization of the relay coil 20 interrupts the holding circuit set forth above, interrupts the circuit for gas valve 18, and re-establishes the circuit for electric heater 46. During the time that the heating plant was in operation the bimetallic element 38 has tended to cool since the electrical heater 46 was deenergized. However, by reason of the short period of operation of the heating plant, this bimetallic element 38 will not have cooled appreciably and, with the heating plant again shut down, heat is again being furnished directly to the bimetallic element 38 by the electrical heater 46. Since the outdoor weather conditions are mild it will be some time before the heat thus supplied to the space 10 has been dissipated so as to again cause a lowering in the space temperature. During this time, the temperature of bimetallic element 38 will have again been raised to such an extent that bimetallic element 38 will again engage stop screw 42 so that contact 36 is again placed in its minimum differential position.

In this manner, under conditions of mild weather, the relative length of time that the heating plant is out of operation is so much greater than the time it is in operation that the contact 36 will always be in its minimum differential position whenever there is a call for heat by the controlling thermostat. If the outdoor weather conditions should become more severe, however, the length of time that the heating plant must remain in operation in order to re-establish the desired room temperature will increase. Likewise, the length of time that the heating plant is out of operation will decrease. The electrical heating element 46 is, therefore, energized for shorter periods and is deenergized for longer periods, with the result that the average temperature of the bimetallic element 38 becomes lower. This causes movement of contact 36 to the left somewhat, whereupon the differential of the thermostat 30 is increased. Because the differential of the thermostat is increased, the space temperature must drop somewhat more than before in order to cause the heating plant to be placed in operation and the space temperature must thereafter be raised to a greater extent in order to render the heating plant inoperative. In this manner, the differential of the thermostat is increased as the outdoor conditions become more severe so that the heating plant is not operated too often during these colder weather conditions.

If the outside weather conditions should become extremely severe, the stop screw 43 will prevent too great an increase in the differential of the thermostat 30 since it limits the leftward movement of bimetallic element 38.

From the foregoing, it will be seen that I have provided an apparatus in which the controlling device has its differential varied as a result of changes in the load upon the condition changing apparatus. In the specific example given, the outdoor weather conditions are a measurement of the load on the heating plant and the adjustment, instead of being direct, is simplified by the apparatus described above whereby it is unnecessary to actually provide an outdoor thermostat that mechanically adjusts the contact 36. While the invention has been explained in connection with heating, and wherein the heating plant is controlled by a space or room temperature responsive thermostat, it will readily be apparent that it is of equal utility in other forms of condition control and particularly where the condition being controlled is some function of the air of an enclosed space. It will be appreciated that many changes can be made in the specific example illustrated without departing from the invention, and I am, therefore, to be limited only by the scope of the appended claims.

I claim:

1. A control system of the class described, comprising, in combination, a condition changer, a condition responsive device in control thereof and requiring a predetermined change in such condition to cause a variation in the operation of said condition changer, and means controlled by the relative periods of operation and non-operation of said condition changer to vary the amount of change in said condition required to cause a variation in the operation of said condition changer.

2. A control system of the class described, comprising, in combination, a condition changer, a condition responsive device in control thereof and requiring a predetermined change in such condition to cause a variation in the operation of said condition changer, and means operated to increase the amount of change required to cause a variation in the operation of said condition changing means controlled by the operating condition of said condition changing means.

3. In combination, electrical means to be controlled, a condition responsive device requiring a predetermined change in the condition to which it responds to place said means in operation, electrical mechanism to vary the amount of change required in said condition to cause energization of said electrical means, and switching mechanism controlled by said electrical means in control of said electrical mechanism.

4. In combination, electrical means to be controlled, a condition responsive device requiring a predetermined change in the condition to which it responds to place said means in operation, temperature responsive means associated with said condition responsive means to vary the operating differential of the same, means to heat said temperature responsive means, and means operated by said electrical means in control of said heating means.

5. In combination, electrical means to be controlled, a condition responsive device requiring a predetermined change in the condition to which it responds to place said means in operation, temperature responsive means associated with said condition responsive means to vary the operating differential of the same, an electrical heater associated with said temperature responsive means, and a switch operated by said electrical means in control of said heater.

6. A heating system of the class described, comprising, in combination, means in control of the supplying of heat to a space, a space temperature responsive thermostat having an operating differential in control of said means, a temperature responsive element associated with said thermostat operative to vary the operating differential thereof, and means to locally heat said temperature responsive element controlled by said heat supply controlling means.

7. In a temperature regulating system, means for changing the temperature of a space, means responsive to the temperature of said space in control of said temperature changing means, said means comprising a first thermostatic element in control of two pairs of contacts and acting to operate said contacts sequentially, means for energizing said temperature changing means when both pairs of contacts are closed and for maintaining the energization of said temperature changing means until both pairs of contacts are open, a second thermostatic element subjected to the influence of a heating device and acting to vary the spacing between one of said pairs of contacts, and means influenced by the ratio of operation to non-operation of said temperature changing means for controlling said heating device.

8. In a temperature regulating system, means for changing the temperature of a space, means responsive to the temperature of said space in control of said temperature changing means, said means comprising a first thermostatic element in control of two pairs of contacts and acting to operate said contacts sequentially, means for energizing said temperature changing means when both pairs of contacts are closed and for maintaining the energization of said temperature changing means until both pairs of contacts are open, a second thermostatic element subjected to the influence of a heating device and acting to vary the spacing between one of said pairs of contacts, and means influenced by outside temperature for controlling said heating device.

9. In a temperature regulating system, means for changing the temperature of a space, means responsive to the temperature of said space in control of said temperature changing means, said means comprising a first thermostatic element in control of two pairs of contacts and acting to operate said contacts sequentially, said contacts being in control of said temperature changing device, a second thermostatic element subjected to the influence of a heating device and adjusting the distance between one of said pairs of contacts in response to the temperature of said heating device, and means for varying the energization of said heating device in accordance with the operation of said temperature changing means.

10. In a temperature regulating system, in combination, means for changing the temperature of a space, thermostatic means in control of said temperature changing means, said thermostatic means comprising a first thermostatic device responsive to the temperature of said space, a heating element, a second thermostatic device subjected to the effect of the heating element for adjusting said first thermostatic device, and means influenced by outside temperature for controlling said heating element.

11. In a temperature control system, in combination, a temperature changer for changing the temperature of a space, means for controlling said temperature changer including a temperature responsive device and a pair of switches actuated thereby, said temperature responsive device actuating said switches sequentially to thereby provide a positive differential between actuation of said switches by said temperature responsive device, one of said switches serving when actuated to place said temperature changer into operation and the other of said switches serving when actuated to place said temperature changer out of operation, and means influenced by outdoor conditions for varying the differential between actuation of said switches.

12. In a condition controlling system, in combination, a condition changing means for changing the condition of a space, said condition changing means including electrically operated means and adapted to assume full operation immediately upon energization of said electrically operated means while ceasing operation immediately upon deenergization of said electrically operated means, a condition responsive device responsive to the condition of said space, said condition responsive device including switching mechanism connected to said electrically operted means for energizing said electrically operated means when the space condition varies to one predetermined value to thereby cause full operation of said condition changer, while deenergizing said electrically operated means when the space condition varies to another value for thereby placing said condition changer out of operation, adjusting means for said space condition responsive device, said adjusting means being arranged for varying the differential between the values above mentioned and including a second condition responsive device and a second condition changing device for locally influencing said second condition responsive device.

13. In a condition controlling system, in combination, a condition changing means for changing the condition of a space, said condition changing means including electrically operated means and adapted to assume full operation immediately upon energization of said electrically operated means while ceasing operation immediately upon deenergization of said electrically operated means, a condition responsive device responsive to the condition of said space, said condition responsive device including switching mechanism connected to said electrically operated means for energizing said electrically operated means when the space condition varies to one predetermined value to thereby cause full operation of said condition changer, while deenergizing said electrically operated means when the space condition varies to another value for thereby placing said condition changer out of operation, adjusting means for said space condition responsive device, said adjusting means being arranged for varying the differential between the values above mentioned and including a second condition responsive device, a second condition changing device for locally influencing said second condition responsive device, and condition responsive means controlling the operation of said second condition changing device.

14. In a temperature controlling system, in combination, means for changing the temperature in a space, temperature responsive means influenced by said temperature changing means in control thereof and acting to place said temperature changing means into operation upon variation in temperature oppositely to the effect of said temperature changing means to a predetermined value, and means responsive to the ratio of operation to non-operation of the temperature changing means for adjusting said temperature responsive means in a manner to vary the temperature at which the temperature changing means is placed into operation in accordance with changes in said ratio.

15. In a condition controlling system, in combination, means for changing the condition in a space, condition responsive means influenced by said condition changing means in control thereof and acting to place said condition changing means into operation upon variation in said condition oppositely to the effect of said condition changing means to a predetermined value, and means responsive to the ratio of operation to non-operation of the condition changing means for adjusting said condition responsive means in a manner to vary the condition at which the condition changing means is placed into operation in accordance with changes in said ratio.

16. In a temperature control system for a building, in combination, a temperature changing means for said building, means including a switch adapted when actuated in one direction to place said temperature changing means into operation, a thermostatic element responsive to the temperature in the building, said thermostatic element actuating said switch in said one direction when the building temperature varies oppositely to the effect of said temperature changing means to a certain value for thereby placing said temperature changing means into operation, said thermostatic element also causing said temperature changing means to be placed out of operation thereafter, means including a heating element for varying the value of temperature at which said thermostatic element actuates said switch in said one direction, said last mentioned means including means for energizing said heating element when said temperature changing means is out of operation while deenergizing said heating element when the temperature changing means is in operation.

17. In a temperature control system for a building, in combination, a temperature changing means for said building, an electro-magnetic relay for controlling said temperature changing means, said relay acting when energized to place said temperature changing means into operation and when deenergized to place said temperature changing means out of operation, a thermostatic switching means responsive to the temperature in said building, said thermostat switching means being connected to said relay and acting to energize said relay upon variation in space temperature oppositely to the effect of said temperature changing means to a certain value for thereby placing said temperature changing means into operation, said thermostatic switching means also deenergizing said relay thereafter, means including a heating element for varying the value of temperature at which said thermostatic switching means energizes said relay, said last mentioned means including contacts on said relay for energizing said heating element when the relay is deenergized and for deenergizing said heating element when the relay is energized.

WILLIAM W. STUART.